United States Patent [19]

Iwahana et al.

[11] 4,153,756
[45] May 8, 1979

[54] ALUMINUM-BASE BEARING ALLOY AND COMPOSITE

[75] Inventors: Keiichi Iwahana; Yoshimi Mathuda; Kenichiro Futamura, all of Toyota, Japan

[73] Assignee: Taiho Kogyo Co., Ltd., Toyota, Japan

[21] Appl. No.: 867,316

[22] Filed: Jan. 6, 1978

[30] Foreign Application Priority Data

Jan. 13, 1977 [JP] Japan .................................. 52-2690
Jun. 20, 1977 [JP] Japan .................................. 52-73145

[51] Int. Cl.² ............................................ B32B 15/04
[52] U.S. Cl. .................................... 428/653; 75/138; 75/140
[58] Field of Search .................... 75/138, 140; 428/653

[56] References Cited
U.S. PATENT DOCUMENTS 2,284,670  6/1942  McCullough et al. ................ 75/138

Primary Examiner—R. Dean

Attorney, Agent, or Firm—Blanchard, Flynn, Thiel, Boutell & Tanis

[57] ABSTRACT

An aluminum-base bearing alloy and a bearing material which is made by applying the bearing alloy to a backing steel by pressure welding. The aluminum-base bearing alloy is characterized in that the lowering of the hardness thereof under high temperature conditions is quite small so that the fatigue strength of the bearing alloy is quite high. The aluminum base bearing alloy comprises 10–30 wt.% of tin, 0.1–1.0 wt.% of chromium or zirconium, and the remainder of aluminum. The bearing alloy of the invention can further contain 0.2–2.0 wt.% of copper or both 0.2–2.0 wt.% of copper and 0.1–0.5 wt.% of beryllium so as to improve its properties. Especially, the aluminum-base bearing alloy containing chromium has the advantage that the tin particles contained in the alloy are prevented from becoming coarse in an annealing step or at elevated temperatures corresponding to the annealing condition. Accordingly, the lowering of the hardness under high temperature conditions can effectively be prevented, and as the result, the fatigue strength can effectively be maintained.

12 Claims, 2 Drawing Figures

ALUMINUM-BASE BEARING ALLOY AND COMPOSITE

BACKGROUND OF THE INVENTION

(1) Field of the Invention

This invention relates to an aluminum-base bearing alloy and a bearing metal which is made by applying the above bearing alloy to a backing steel by pressure welding. More particularly, the invention relates to an Al-Sn alloy which is prepared by adding tin to aluminum base metal and the bearing alloy of the invention is characterized in that the lowering of its hardness under high temperature conditions is small, the fatigue strength is high and the adhesion thereof to the backing steel is quite large in practical use.

(2) Description of the Prior Art

In the conventional art, Al-Sn alloys have mainly been employed as aluminum bearing alloys. When this kind of alloy is used for the bearings of automobile engines, however, fatigue failure is liable to occur in a short period of time especially when an engine is run at full-load continuously. It is considered to be attributable to the fact that the lubricant oil in an engine becomes too hot during continuous full-load running, for example, the temperature of the oil in the oil pan is raised to 130° C. or higher, so that the lubricant oil on the sliding surface of the bearing becomes considerably high, and accordingly, in the conventional Al-Sn alloy, the hardness at high temperature conditions is suddenly lowered since the eutectic point of such alloy is about 225° C. or so, which reduces the fatigue strength.

Further, in addition to the lowering of the fatigue strength due to the loss of hardness at high temperatures mentioned above, the coarsening of tin particles in the texture of conventional Al-Sn alloy also causes lowering of the fatigue strength. That is, the aluminum bearing material is formed by applying Al-Sn alloy to a backing steel through pressure welding, in which an annealing step is required after the pressure welding in order to improve the adhesive strength between both metals. The annealing is generally done at a temperature below the point at which an Al-Fe inter-metallic compound deposits (about 475° C.) and the higher the treating temperature is and the longer the treating time is, the larger the adhesion strength becomes. As a matter of fact, when the Al-Sn alloy is placed in a high temperature condition during annealing, the migration of aluminum crystal particles and tin particles in the alloy texture is caused to occur and as the result of this, the tin particles become coarse with the passing of time. In brief, when the conventional aluminum bearing alloy is subjected to annealing in order to improve the adhesive strength, the coarsening of tin particles is caused to occur, which results in lowering of the hardness of the Al-Sn alloy at high temperatures. Accordingly, the fatigue strength of the alloy is reduced.

BRIEF SUMMARY OF THE INVENTION

In order to obtain a new and improved aluminum alloy which is free from the above disadvantages of the lowering of hardness at high temperatures and the coarsening of tin particles which also occurs in a high temperature condition, the inventors of the present application have carried out extensive studies by adding several additional elements to the Al-Sn alloy. As a result, the aluminum bearing alloy which satisfies both the above requirements, can be accomplished.

It is, therefore, the primary object of the present invention to provide an Al-Sn alloy which exhibits a small lowering of hardness at high temperatures, and as a result, has a high fatigue strength.

Another object of the present invention is to provide an improved Al-Sn alloy in which the coarsening of tin particles is not caused to occur during the annealing step or during use under high temperature conditions, which results in a higher fatigue strength.

A further object of the present invention is to provide a bearing material which is made by applying the above alloy to the surface of a backing steel sheet.

The aluminum bearing alloy of the present invention is an alloy which is made by adding 0.1 to 1.0 wt.% of chromium or 0.1 to 1.0 wt.% of zirconium to a basic alloy consisting of 10 to 30 wt.% of tin and the remainder of aluminum. Further, the invention includes a bearng material which is made by applying the above alloy to a backing steel by pressure welding. The effects of the addition of chromium and zirconium are the same for the prevention of lowering of the hardness in high temperature conditions. However, the prevention of the coarsening of tin particles in high temperature conditions can be achieved only by the addition of chromium. With the above effects, the Al-Sn bearing alloy of the present invention has a greater hardness as compared with the conventional Al-Sn alloys, and expecially, the lowering of the hardness at high temperatures of the alloy of this invention is very small. Further, when chromium is added to the alloy, it has been understood from the observation of alloy texture that the fine particles of tin are maintained as they stand after annealing. In fatigue tests under dynamic loads, the inprovement in fatigue strength at a higher oil temperature has been confirmed.

Furthermore, the bearing alloy of the present invention can also contain 0.2 to 2.0 wt.% of copper or both 0.2 to 2.0 wt.% of copper and 0.1 to 0.5 wt.% of beryllium. With such additions, the lowering of the hardness at high temperatures can be effectively avoided and, especially with the addition of copper, the toughness of the alloy can be improved. By the way, the existence of unavoidable quantities of impurities will not cause any trouble.

BRIEF DESCRIPTION OF THE DRAWINGS

The objects, features and advantages of the present invention will be more clearly understood from the following detailed description, examples and accompanying drawings, in which.

DETAILED DESCRIPTION OF THE INVENTION

Figure 1:
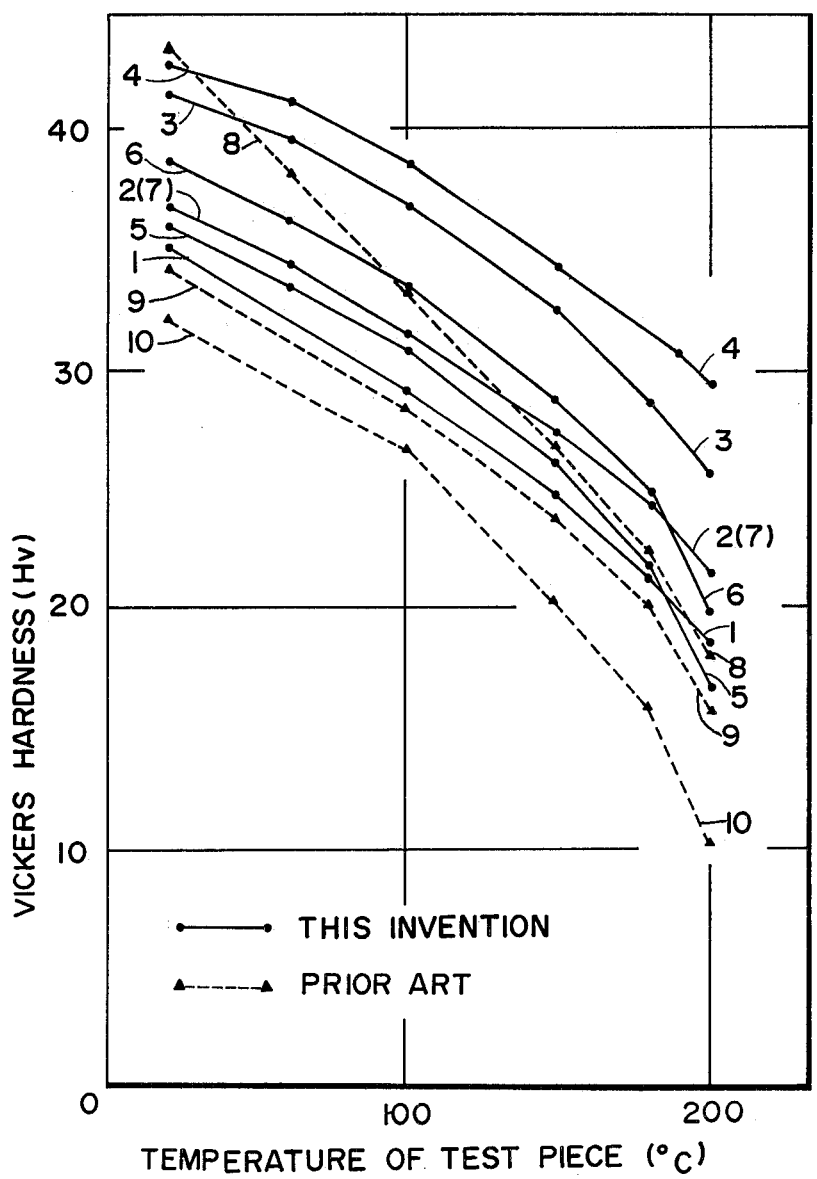
FIG. 1 is a graph showing the changes in hardness with changes of temperatures with regard to the aluminum bearing alloy of the present invention and those of the prior art of the same type.

As described above, the basic alloy of the present invention consists of aluminium as the matrix, 10 to 30 wt.% of tin and 0.1 to 1.0 wt.% of chromium or zirconium. The tin is added for the main purpose of imparting a low friction property. The reason why the content of tin is restricted to the range of 10 to 30 wt.% depends upon the fact that the addition of tin in an amount of more than 30 wt.% improves the conformability and low friction property. However, it reduces the hardness of the bearing alloy. When the quantity of tin is less than 10 wt.%, on the contrary, the bearing alloy becomes too hard and is insufficient in view of conformability or the like. According to the prior art, the upper limit of the amount of tin has been regarded as being about 15% to the Al-Sn alloy so as to separately disperse tin particles, because it has been considered that, when more than 15 wt.% of tin is contained, the tin particles in the aluminum matrix cannot exist in a separated state, but, rather they exist in a continuous state and the tin particles are softened and moved near the eutectic point so that the hardness in high temperature conditions becomes low. In the present invention, however, the addition of tin up to 30 wt.% has been made possible without any practical disadvantage, by the effect of the addition of the other elements. The addition quantity of tin in the range of 10 to 30 wt.% may be determined properly according to expected uses. Generally speaking, the addition quantity of tin is made small when bearings receive a large load, while for light duty purposes, much tin can be added to the bearing alloy. In another viewpoint, when there is fear of seizure, the addition quantity of tin may be increased, while if there is no fear of seizure, the quantity of tin may be reduced.

As the common effect of the addition of chromium and zirconium, the prevention of the lowering of hardness at high temperatures can be mentioned. Further, in accordance with the studies and experiments done by the present inventors, chromium has another effect, which is not achieved by the addition of zirconium, that is, the addition of chromium avoids the coarsening of tin particles.

In the first place, the above common effect to avoid the softening of alloy will be described. When the quantity of chromium or zirconium is less than 0.1 wt.%, the improvement in high temperature hardness cannot be expected. If the addition quantity of them exceeds 1.0 wt.%, too much Al-Cr inter-metallic compound such as $CrAl_7$ or Al-Zr inter-metallic compound is formed which makes the bearing alloy excessively hard. Therefore, the addition quantities of chromium and zirconium are restricted to the range of 0.1 to 1.0 wt.%. More particularly, the recrystallizing temperature of aluminum is raised when the chromium or zirconium is contained in aluminum in the state of a solid solution and this effect becomes maximum when the addition quantity of chromium or zirconium is about 0.5 wt.%. With this rise of the recrystallizing temperature of aluminum, the bearings of engines that are exposed to high temperatures can maintain their mechanical properties. Especially, the lowering of hardness at high temperatures can be reduced and the softening of bearings in a high temperature range can be well avoided. In addition, it causes also an improvement of the fatigue strength. Further, the Al-Cr or Al-Zr inter-metallic compound that is deposited over the limit of solid solution, has a Vickers hardness of more than 320 so that the dispersion of such compound aids the bearing alloy in maintaining the high temperature hardness. Therefore, the dispersion of such inter-metallic compound in a proper quantity gives a good effect. The preferable range of the quantity of chromium or zirconium is, as described above, not more than 1.0 wt.%, and if the quantity of chromium or zirconium is within such range, fine and uniform deposition of inter-metallic compound is formed without causing any ill effect and it increases the hardness of the bearing alloy.

The effect of the addition of chromium to avoid the coarsening of tin particles will be described in the following. A piece of Al-Sn alloy containing chromium and another piece of Al-Sn alloy containing no chromium were annealed at about 350° C. and the metal textures were observed with microphotographs. As a result, it was understood that the tin particles in Al-Sn alloy with chromium were almost prevented from coarsening and the state of fine particles of tin was well maintained, while in another Al-Sn alloy without chromium, the tin particles became coarse. This may depend upon the following reason. That is, as described above, the coarsening of tin particles is a phenomenon owing to the migration of aluminum grain boundaries and tin particles in a high temperature condition of the Al-Sn alloy. Since the chromium is deposited as the above-mentioned Al-Cr inter-metallic compound which is finely dispersed in the aluminum alloy matrix, this inter-metallic compound inhibits directly the migration of aluminum grain boundaries and, at the same time, it obstructs the growth of aluminum crystal grains. Therefore, the migration of tin particles is also hindered and, as the result, the coarsening of tin particles can be avoided. Further, since the tin particles are well maintained in a finely dispersed state in the aluminum matrix, the liquidation of tin particles having a low melting point of about 224° C. can be effectively prevented in the high temperature condition. In view of this fact, the effect of the prevention of lowering in hardness can be understood. Accordingly, when the aluminum bearing alloy is applied to a backing steel by pressure welding and is subjected to annealing, the tin particles are prevented from coarsening and the softening and resultant lowering of fatigue strength are not caused to occur. Furthermore, since the coarsening of tin particles does not occur during annealing, the annealing temperature can be raised and the time for it can be lengthened. Accordingly, the adhesive strength between the Al-Sn alloy and the backing steel can be easily increased. In the above is described the effect for preventing the coarsening of tin particles in the annealing step. This effect can be applied to the working condition of the present bearing material in which the temperature is equal to the annealing condition. Therefore, the fatigue strength in the practical use is also improved with the inhibition of softening.

In accordance with the studies and experiments done by the present inventors, the effect for preventing the coarsening of tin particles is recognized in the use of chromium, while it can not be recognized in the addition of zirconium. The mechanism in the difference in these effects is not clear, but the difference in quantities of deposited Al-Cr and Al-Zr inter-metallic compounds is considered to be one of the factors. In fact, the temperature range of annealing in the experiment was up to about 350° C., so that there remains some possibility that zirconium shows the same effect at temperatures above such range. In connection with zirconium, another effect of the above, that is, the effect to keep the hardness in high temperature conditions is sufficiently recognized and, accordingly, the bearing alloy containing zirconium can also be used for certain purposes with full advantages.

The second invention of the present application is another Al-Sn bearing alloy which contains 0.2 to 2.0 wt.% of copper in addition to the foregoing composition, and a bearing material which is made by applying the above bearing alloy to a backing steel by pressure welding. This copper is added to the bearing alloy in order to lessen the lowering of hardness in high temperature conditions and to improve the toughness. When copper is added with the aim of improving only toughness, the quantity of copper may be 0.2 to 2.0 wt.%, while if the lowering of hardness is to be inhibited simultaneously, the addition quantity of copper may be within the range of 0.5 to 2.0 wt.%. If the quantity of copper is less than 0.5 wt.%, the increase of hardness is not so much expected, while if the quantity of copper exceeds 2.0 wt.%, the hardness of the alloy is increased. However, a hard compound of $CuAl_2$ will deposit with the increase of copper in the alloy, which is not desirable as the material for bearings. Further, the effect of copper in view of hardness can be obtained only when it is added together with the chromium or zirconium. When copper is solely added to the bearing alloy, the increase of hardness at high temperatures cannot be expected. That is, when copper is added to aluminum, the hardness in rolling is much increased, the degree of which is remarkable as compared with the aluminum-base materials which contain other elements. However, when the aluminum containing copper is heated to about 200° C., it easily becomes soft so that it can not be expected to maintain the hardness at high temperatures. On the other hand, when copper is added together with chromium or zirconium, the increased hardness in rolling as the effect of copper addition is not so much reduced in the annealing step with the effect of the addition of chromium or zirconium. Therefore, a quite hard Al-Sn alloy can be obtained and this hardness is not lost at high temperatures, which is quite different from the alloys of this kind in the conventional art.

The third invention of this application relates to an aluminum bearing alloy which comprises 10 to 30 wt.% of tin, 0.1 to 1.0 wt.% of chromium or zirconium, 0.2 to 2.0 wt.% of copper, 0.1 to 0.5 wt.% of beryllium and the remainder of aluminum, and a bearing material which is made by applying the above bearing alloy to a backing steel by pressure welding. The addition quantity of beryllium is determined by the following reasons. That is, when the addition quantity of beryllium is less than 0.1 wt.%, the lowering of hardness at high temperatures cannot be expected, while if the addition quantity of beryllium is more than 0.5 wt.%, an inter-metallic compound deposits in the bearing alloy which is not desirable for bearings. The effect of the addition of beryllium is recognized in the maintenance of hardness at high temperatures. The effect of increase of hardness in rolling and the effect of inhibiting the softening of aluminum at high temperatues owing to the addition of beryllium, are not so notable as compared with those of copper, chromium and zirconium. However, the lowering of hardness at high temperatures can be decelerated by the addition of beryllium. Accordingly, the hardness of alloy can be maintained on a higher level in high temperature conditions by the addition of beryllium. Further, beryllium improves the castability by reducing the oxidation of aluminum, tin, chromium and zirconium when the alloy is melted.

EXAMPLES

The present invention will be described in more detail with reference to several examples. The following Table 1 shows the chemical compositions of Al-Sn bearing alloys of the present invention (1) to (7) and the bearing alloys of the same kind in the conventional art (8) to (10).

Table 1

| Example | Number of Alloy | Al | Sn | Cr | Cu | Be | Si | Ni |
|---|---|---|---|---|---|---|---|---|
| 1 | 1 | Remain- | 10 | 0.15 | — | — | — | — |
| 2 | 2 | " | 17 | 0.5 | — | — | — | — |
| 3 | 3 | " | 17 | 0.5 | 1 | — | — | — |
| 4 | 4 | " | 17 | 0.5 | 1 | 0.3 | — | — |
| 5 | 5 | " | 25 | 0.5 | — | — | — | — |
| 6 | 6 | " | 25 | 0.5 | 0.5 | — | — | — |
| 7 | 7 | " | 20 | 0.8 | — | — | — | — |
| 8 | 8 | " | 6 | — | 1 | — | 1.5 | 0.4 |
| 9 | 9 | " | 20 | — | 1 | — | — | — |
| 10 | 10 | " | 30 | — | 1 | — | — | — |

In the preparation of Alloys (1) to (7) in Examples (1) to (7), respectively, an ingot of aluminum was melted in a gas furnace and then, according to each composition, Al-Cr mother alloy, Al-Cu mother alloy or Al-Be mother alloy was dissolved and after that, tin was added to the molten bath. After the degassing of the molten bath, it was poured into a mould at a bath temperature of 720° C. Test pieces were formed by subjecting the cast alloy to rolling and annealing (350° C.) repeatedly. Then, the hardnesses of the test pieces at high temperatures were measured. These test pieces were further rolled and applied to backing steel sheets by pressure welding to obtain bimetal pieces. After the annealing (380° C.) of them, they were formed into plane bearings and subjected to dynamic load fatigue tests. In order to make a comparison, Alloys (8), (9) and (10) having the conventional compositions were prepared in like manner as the above alloys to obtain similar test pieces, which were subjected to the same tests.

FIG. 1 shows the results of Vickers hardness tests at high temperatures with regard to the above Alloys (1) to (10). The results on Alloy (7) were almost the same as those of Alloy (2) so that the results of both of them are shown with a single line. As will be understood from this graph, the hardnesses of Alloys (1) to (7) of the present invention at all temperatures are higher than those of Alloys (9) and (10) in the conventional art. When compared with Alloy (8) in the conventional art, the Alloy (8) has a high hardness in the lower temperature range, however, its hardness becomes abruptly low with the rise of temperature. On the other hand, Alloys (1) to (7) of the present invention show slow lowering of hardnesses with the rise of temperature, accordingly, the state of the bearing is not liable to vary with the change of temperature. Further, Alloys (3) and (6) containing copper in addition to tin and chromium, and another Alloy (4) containing 0.3 wt.% of beryllium in addition to the components of Alloy (3), have especially higher hardness in all the temperature range. Furthermore, the lowering of their hardnesses with the rise of temperature is quite slow as compared with Alloy (8), especially it is to be noted that the hardnesses of them are very high even at a temperature of 200° C. This fact depends upon the addition of chromium and beryllium. With regard to Alloys (1) to (7) of the present invention, it was further recognized by the observation of alloy textures that the coarsening of tin particles did not occur through the annealing after the application of alloys to backing steel sheets.

Figure 2:
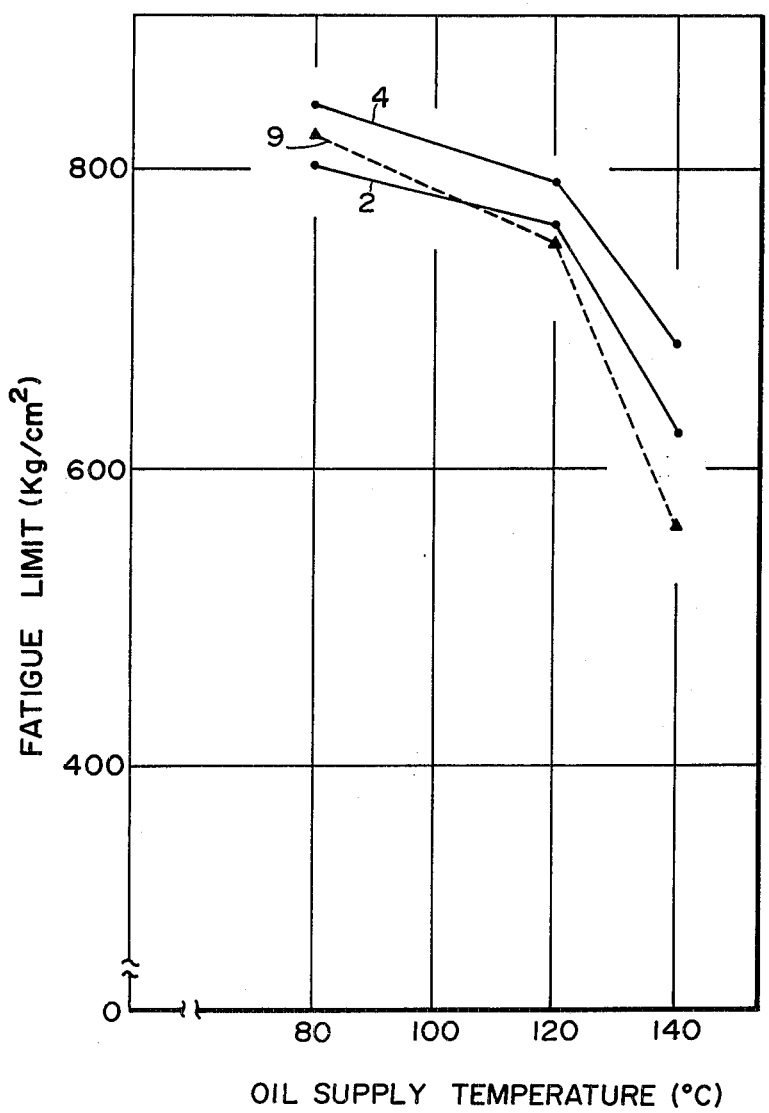
FIG. 2 is also a graph showing the changes in fatigue limits with the changes of oil temperatures with regard to the aluminum bearing alloy of the present invention and a prior art alloy.

FIG. 2 shows the results of dynamic load fatigue tests in connection with Alloys (2) and (4) of the present invention and Alloy (9) in the conventional art. In this test, the maximum stresses (fatigue limits) at different temperatures were measured under forced lubrication with lubricant oil of a certain temperature and by using a quenched shaft material of S55C (structural carbon steel containing 0.5-0.6% of carbon) at 3000 r.p.m. As will be understood from this figure, the fatigue limits of all the Alloys (2), (4) and (9) decrease with the rise of temperature, however, in the cases of Alloys (2) and (4) of the present invention, the degrees of decrease in fatigue limits are small as compared with Alloy (9) in the conventional art. Further, the differences of fatigue limits among Alloys (2), (4) and (9) at a lower temperature are not so large. However, it may be clear that the fatigue limits of Alloys (2) and (4) are superior to that of Alloy (9). Further, it should be noted that similar effects and results can be obtained when the above chromium is replaced by zirconium and the aluminum can contain the impurities that are unavoidable in the ordinary smelting process.

As described above, the aluminum bearing alloy of the present invention that contains chromium or zirconium has a low degree of softening in high temperature conditions so that its fatigue strength is large. Further, with regard to the bearing alloy containing chromium, the fine particles of tin dispersion can be well maintained even when the alloy is applied to a backing steel and annealed since the coarsening of tin particles can be avoided. Therefore, such bearing alloy is suitable as those which are used by annealing or at a temperature near the annealing temperature.

Lastly, it should be emphasized that the above specific examples are intended as merely illustrative and in no way restrictive of the invention. It is preferred, therefore, that the present invention be limited not by the specific disclosure therein, but only by the appended claims.

What is claimed is:

1. An aluminum base bearing alloy consisting essentially of 10-30 wt.% of tin, 0.1-1.0 wt.% of chromium and the remainder of aluminum.

2. An aluminum base bearing alloy as claimed in claim 1, also containing 0.2-2.0 wt.% of copper.

3. An aluminum base bearing alloy as claimed in claim 1, also containing 0.2-2.0 wt.% of copper and 0.1-0.5 wt.% of beryllium.

4. An aluminum-base alloy bearing material which is made by applying the aluminum-base bearing alloy claimed in claim 1 to a backing steel sheet by pressure welding.

5. An aluminum-base alloy bearing material which is made by applying the aluminum-base bearing alloy claimed in claim 2 to a backing steel sheet by pressure welding.

6. An aluminum-base alloy bearing material which is made by applying the aluminum-base bearing alloy claimed in claim 3 to a backing steel sheet by pressure welding.

7. An aluminum-base bearing alloy consisting essentially of 10-30 wt.% of tin, 0.1-1.0 wt.% of zirconium and the remainder of aluminum.

8. An aluminum-base bearing alloy as claimed in claim 7, also containing 0.2-2.0 wt.% of copper.

9. An aluminum-base bearing alloy as claimed in claim 7, also containing 0.2-2.0 wt.% of copper and 0.1-0.5 wt.% of beryllium.

10. An aluminum-base alloy bearing material which is made by applying the aluminum-base bearing alloy claimed in claim 7 to a backing steel sheet by pressure welding.

11. An aluminum-base alloy bearing material which is made by applying the aluminum-base bearing alloy claimed in claim 8 to a backing steel sheet by pressure welding.

12. An aluminum-base alloy bearing material which is made by applying the aluminum-base bearing alloy claimed in claim 9 to a backing steel sheet by pressure welding.

* * * * *